United States Patent

[11] 3,589,260

| [72] | Inventor | Michael Anthony Ferra<br>6131 Dalecrest Ave., Woodland Hills, Calif. 91364 |
|---|---|---|
| [21] | Appl. No. | 810,971 |
| [22] | Filed | Mar. 27, 1969 |
| [45] | Patented | June 29, 1971 |

[54] ADJUSTABLE CAMERA MOUNT
16 Claims, 4 Drawing Figs.

[52] U.S. Cl. .................................................. 95/86
[51] Int. Cl. .................................................. G03b 17/56
[50] Field of Search .................................................. 95/86; 248/178, 187

[56] References Cited
UNITED STATES PATENTS

| 1,199,307 | 9/1916 | Risley | 95/86 |
| 1,451,382 | 4/1923 | Wescott | 248/187 X |
| 1,971,486 | 8/1934 | Jennings et al. | 95/86 X |
| 2,356,383 | 8/1944 | Clarke | 95/86 |
| 2,746,369 | 5/1956 | Beard et al. | 95/86 |

Primary Examiner—Samuel S. Matthews
Assistant Examiner—M. L. Gellner
Attorney—Pastoriza and Kelly ABSTRACT: A camera mount for simultaneously holding a motion picture camera and a lens assembly includes a base attachable to a tripod, a carrier slidably mounted on the base and a lens stabilizer coupled to the carrier. The center of gravity of the camera, lens assembly and mount can be shifted over the tripod to improve balancing by sliding the carrier relative to the base. The lens stabilizer, which includes a cradle for retaining the lens assembly, is slidably mounted on the carrier and incorporates a fine tuning lens adjustment means. When an object to be filmed has been brought into general view then the lens adjustment means can be both horizontally and vertically aligned in order to accurately center the object.

INVENTOR:
MICHAEL ANTHONY FERRA
BY
Elliott & Pastoriza
ATTORNEYS

INVENTOR:
MICHAEL ANTHONY FERRA
BY
Elliott & Pastoriza
ATTORNEYS

ADJUSTABLE CAMERA MOUNT

This invention relates to camera mounts and more specifically to a camera mount for accommodating a zoom lens assembly and a motion picture camera, the mount being adjustable to precisely balance and accurately align an object.

BACKGROUND OF THE INVENTION

Ordinary camera mounts structured to simultaneously mount a motion picture camera and a zoom lens assembly, such as the mounts typically used by professional cameramen, have a base section and a relatively slidable lens assembly section extending forwardly of the base section.

When the base section is removably clamped to a camera tripod it cannot be adjusted relative to the tripod in order to accommodate lens assemblies of varying lengths and weights. Ideally the center of gravity ought to be shifted over the center of the tripod to improve balancing and greatly facilitate the efforts of the cameraman in maneuvering, aiming, and focusing the camera. Imbalance results in uncontrollable jerkiness that necessarily prolongs the cameraman's efforts and produces fatigue.

Another disadvantage inherent in conventional motion picture cameras is experienced when the cameraman inadvertently forgets to tighten the safety lock, if any, of the lens assembly and then causes the camera to be tilted downwardly in order to film a particular object. Under these circumstances the lens assembly may fall outwardly from the lens assembly section and injure a person while, in addition, becoming damaged itself.

It is difficult and time consuming to accurately sight through the camera and lens assembly and accurately align an object to be filmed. Part of the difficulty arises because of the poor balancing as previously described. Other difficulties arise because after the mount is locked against the tripod from further movement there is no provision for fine tuning in order to slowly guide the lens assembly to a position where the object is centered.

Other disadvantages and annoyances of conventional camera mounts that are substantially overcome by the present will be subsequently described.

BRIEF SUMMARY OF THE INVENTION

Briefly stated the present invention comprehends a camera mount for holding a motion picture camera and lens assembly the mount being adjustable, versatile, and, easy to manipulate and switch between hand-held and tripod mounted picture taking positions. The mount includes a carrier structure shaped for holding a motion picture camera and a lens assembly stabilizer that includes a cradle for holding the lens assembly. The carrier includes a guide plate formed with a guide slot that receives a slide member of the lens assembly stabilizer in order to permit relative sliding movement between the carrier structure and lens assembly stabilizer. Lens adjustment means coupled to the lens assembly stabilizer is arranged to displace the cradle relative to the slide member in order to accurately center an object to be filmed.

The carrier structure includes a recess formed in a side portion and a pair of attachment posts fixed at spaced locations adjacent to the recess edge. The camera may be an Arriflex motion picture having a depending handle positionable in the recess and a pair of attachment pegs shaped to attach to the posts in order to align the camera.

The mount preferably includes a base for slidably mounting the carrier structure. The base has a raised section of dovetail configuration with upwardly flaring sidewalls and the carrier structure is formed with an interlocking groove of complementary dovetail configuration. The carrier structure can be easily slid along the base in order to achieve the necessary balancing so that the cameraman's effort in sighting and focusing the object is greatly facilitated.

The slide member of the lens assembly stabilizer and guide slot of the carrier structure guide plate are also characterized by complementary dovetail configurations to permit relative sliding.

A pair of parallel and laterally spaced rods is secured to the carrier structure and the rods extend generally beneath the carrier structure and lens assembly stabilizer to slidably mount a matte box. Due to this structural arrangement various lenses of the lens assembly can be rotated without imparting rotation to or otherwise harmfully influencing filter panels positioned in the matte box.

The lens adjustment means includes a horizontal alignment means and a vertical alignment means for displacing the cradle horizontally and vertically respectively relative to the slide member.

BRIEF DESCRIPTION OF THE DRAWINGS

The numerous benefits and unique aspects of the present invention will be fully understood when the following detailed description is studied in conjunction with the drawings in which.

Figure 1:
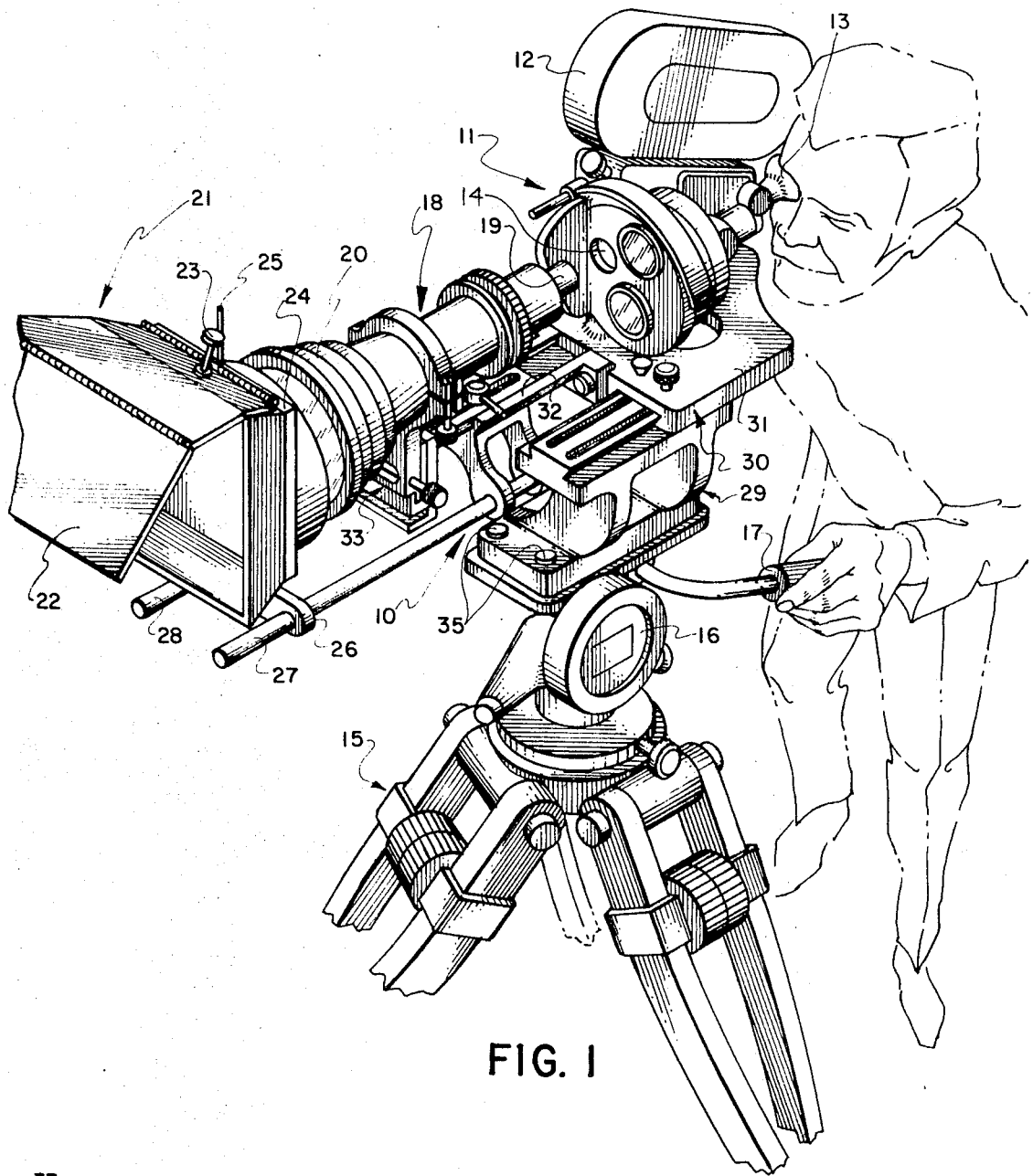
FIG. 1 is a perspective view showing an adjustable camera mount constructed in accordance with the present invention supporting a motion picture camera and zoom lens assembly.

DETAILED DESCRIPTION OF THE PREFERRED EMBODIMENT:

Referring now to FIG. 1 an adjustable camera mount is shown supporting a motion picture camera 11. Although the camera mount 10 is constructed in accordance with this invention is sufficiently versatile to accommodate numerous types of motion picture cameras, camera 11 is shown as an Arriflex motion picture camera. More specifically camera 11 may be a commercially available Arriflex 35 model 2C built by the Arriflex Corporation of America, which type of camera is widely used by professional cameramen filming for the television and movie industry.

Motion picture camera 11 has a film magazine 12, an eyepiece 13 through which the cameraman may view the object to be filmed, and, a lens port 14 formed in the front section of camera 11.

Camera mount 10 is removably secured to a conventional camera tripod 15 that includes a swivel head 16 capable of being rotated and tilted by the cameraman when manipulating an elongated control handle 17.

A different and forwardly disposed section of mount 10 supports a zoom lens assembly 18 which, for example, may be a 10 to 1 or 50 to 500 power zoom lens. When zoom lens assembly 18 is fully installed for use its rearwardly disposed lens ring 19 will be inserted into lens port 14.

A frontal lens section 20 is insertable into an opening formed in a matte box 21. Matte box 21 which can be constructed of metal or leather includes a forwardly extending sunshade 22 whose attitude or inclination can be varied by an adjustment screw 23. A filter panel 24 includes the usual light filters constructed to accommodate the particular environmental lighting condition. A handle 25 can be used to withdraw filter 24 and replace it with another type of filter panel. A cross rod 26 oriented beneath and coupled to matte box 21 includes a pair of openings (only one of which is shown) at its opposing ends. These openings are sized to slip over a pair of elongated iris rods 27 and 28 that are parallel with one another and the longitudinal centerline of camera mount 10.

The purpose of resting matte box 21 upon iris rods 27 and 28 is to permit adjustment and rotation of frontal lens section 20 without rotating, jiggling, or otherwise disrupting the orientation of filter panel 24. When conventional motion picture camera mounts are employed it is customary to couple the matte box and frontal lens section of a zoom lens assembly together in such a manner that neither is capable of moving independently. It will be appreciated that when such a dependent coupling results then any rotation or adjustment of the frontal lens section automatically results in disturbing the filter panel and hence the light polarization properties of the filter panel. The structural arrangement described above eliminates this problem so frontal lens section 20 can be freely moved without disturbing the polarization pattern of a filter panel 24. Mount 10 has a base 29 detachably coupled to swivel head 16. A carrier 30 slidably mounted on base 29 incorporates a stand 31 for holding motion picture camera 11 and a forwardly extending guide plate 32. A lens assembly stabilizer 33 is slidably coupled to guide plate 32.

Figure 2:
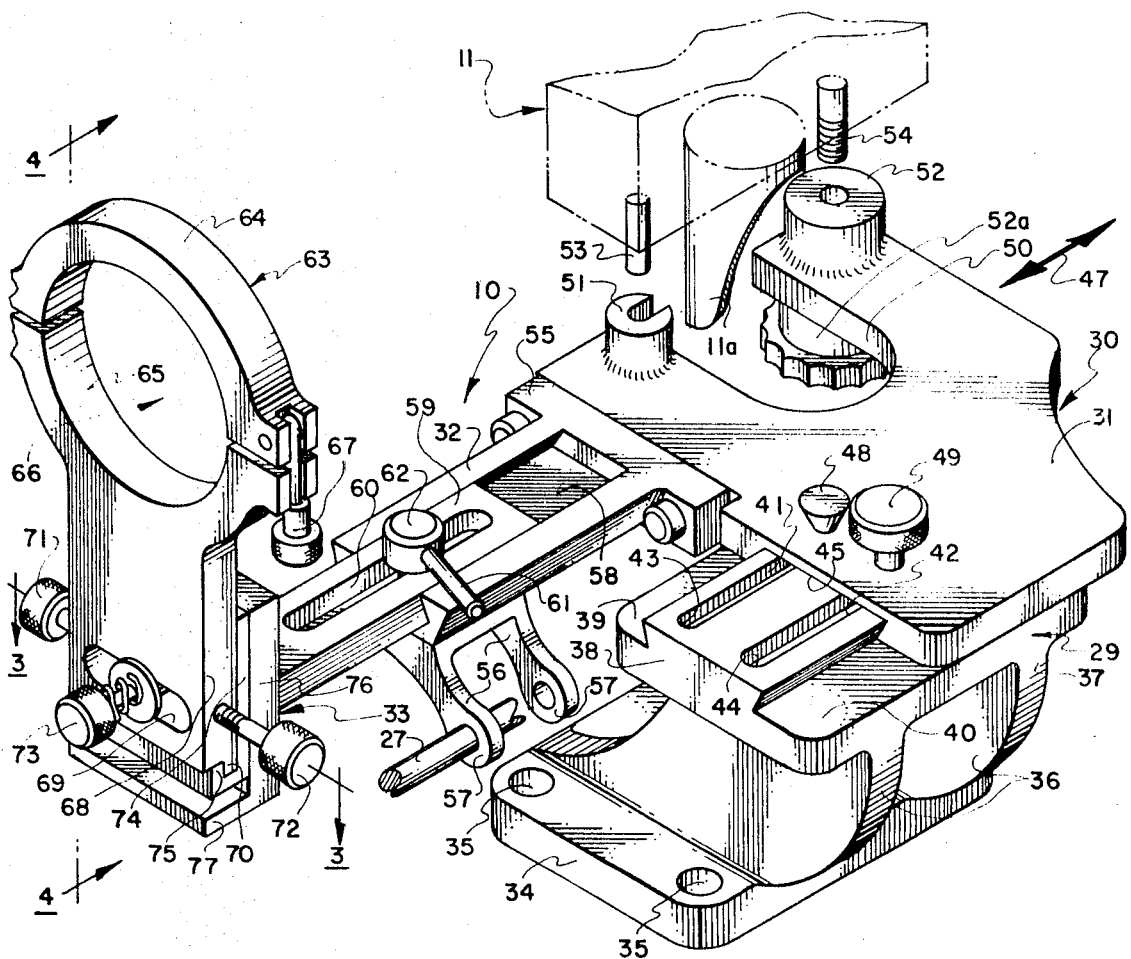
FIG. 2 is a perspective view with a motion picture camera section exploded away from the mount, showing interrelationships of important components of the mount, mount.

Referring now to FIG. 2 which illustrates important interrelationships between the various components of this invention, base 29 has a foundation plate 34 formed with a series of attachments openings 35 for retaining bolts (not shown) in order to couple the tripod with mount 10. A pair of risers or stanchions 36 extend between forward and rearward sections of plate 34 and an overlying bearing plate 37. Bearing plate 37 is integrally formed with a pedestal or raised section 38 characterized by a dovetail configuration whose opposing sidewalls flare upwardly. The bases of the flaring dovetail sidewalls are joined to parallel bearing surfaces 39 and 40.

The top wall of raised section 38 is formed with a pair of parallel slide channels 41 and 42. The forward and rearward ends of each channel 41 and 42 terminate inwardly of the corresponding end walls of raised section 38 in order to form stops 43 and 44. The important purpose of channels 41 and 42 and their associated stops 43 and 44 respectively will be described subsequently.

Carrier 30 includes a longitudinally extending shallow section that defines an interlocking groove 45. Interlocking groove 45 is characterized by a dovetail configuration of complementary shape relative to that of riser 38. When base 29 is secured to the tripod then carrier 30 is permitted to slide on raised section 38 and bearing surfaces 39 and 40 as indicated by directional arrow 47. Secured within appropriate openings in stand 31 are a snap lock 48 that fits into slide channel 41 and a screw lock 49 that fits into slide channel 42. Snap lock 48 is biased against the bottom of channel 41 while screw lock 49 must be tightened in order to bear against the bottom of slide channel 42. By arranging snap lock 48 and screw lock in laterally offset relationship the tendency of stand 31 to teeter or jiggle when screw lock 49 is fully tightened is eliminated. If locks 48 and 49 were both aligned within a single slide channel then some slight instability might result. The locks 48 and 49 could be interchanged without hindering their joint effect in suppressing instability problems.

The side of stand 31 opposite to that side which is slidably coupled to base 29 is formed with a large recess 50. A pair of apertured attachment posts 51 and 52 are secured to stand 31 on opposing forward and rearward portions of recess 50. Attachment pegs 53 and 54 depend from the bottom of motion picture camera 11 and are spaced and sized for entering attachment posts 51 and 52 respectively. When pegs 53 and 54 are inserted within and tightened against corresponding posts 51 and 52 by locking knob 52a then camera 11 will be adequately aligned for operation.

The rearward end 55 of guide plate 32 is securely bolted to stand 31. A pair of depending arms 56 secured to the bottom portion of guide plate 32 are formed with retaining rings 57 for retaining and suspending the iris rods. One set of retaining rings 57 are shown associated with the innermost iris rod 27.

Guide plate 32 is formed along its longitudinal centerline with a guide slot 58 characterized by a dovetail configuration with inwardly converging sidewalls. The lens assembly stabilizer 33 includes a slide member 59 having a dovetail configuration of complementary shape relative to guide slot 58. Slide member 59 is formed with an elongated slot 60 that retains a clamping key 61. Clamping key 61 has an enlarged body 62 whose edges overlap and bear against the top surface margins of slide member 59. In order to slide the slide member 59 in guide slot 58 the clamping key 61 is torqued to loosen the wedging action between slide member 59 and guide plate 32. As an additional safety feature slide member is coupled to a safety catch (not shown) formed by the base of guide plate 32 so that even when slide member 59 is loosened the member 59 will be prevented from sliding out of slot 58. Otherwise if the cameraman were inadvertent and forgot to tighten clamping key 61 the entire expensive zoom lens assembly and stabilizer 33 could tumble to the ground in which case it could become seriously damaged and/or injure a person.

The lens assembly stabilizer 33 includes a conventional lens cradle 63 for retaining a section of the zoom lens assembly shown in FIG. 1. Cradle 63 has split rings 64 and 65 which, when the zoom lens is projected through central opening 66, can be secured together by a clamping nuts 67.

Lens assembly cradle 63 includes front vertical wall 68 with a horizontally extending opening 69 and a lowermost positioning lip 70. A pair of horizontal alignment elements 71 and 72 are arranged in coaxial relationship and extend through openings in opposing sidewalls of vertical wall 68. Elements 71 and 72 are shown in the form of screws interengaged with internal threads constituted by the side wall openings. A locking or stabilizer element 73 extends through opening 69 in which position its opposing sidewalls are engaged by the inner ends of horizontal alignment elements 71 and 72.

Behind and arranged in abutting engagement with the vertical wall 68 is an intermediate vertical wall 74 formed at its lower end with a positioning channel structure 75 for receiving positioning lip 70. Behind intermediate vertical wall 74 is a rearward vertical wall 76 formed at its base with a forwardly protecting ledge 77 that extends beneath wall 68 and wall 74.

Figure 3:
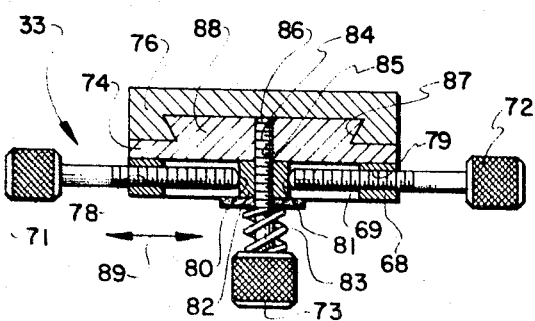
FIG. 3 is a detailed sectional view taken along line 3-3 of FIG. 2.

FIG. 3, a detailed sectional view taken along line 3–3 of FIG. 2, shows the internally threaded openings 78 and 79 through the sidewalls of front vertical sidewalls of front vertical wall 68 and with which horizontal aligned elements 71 and 72 are respectively interengaged. The inner ends 80 and 81 of alignment elements 71 and 72 respectively bear against diametrically opposed sides of a collar 82 which surrounds and is threaded to stabilizer element 73. Element 73 has a threaded section 84 a portion of which is interengaged with collar 82 and another more inward portion of which is interengaged with a threaded opening 85 formed in intermediate vertical wall 74. The inner end 86 of stabilizer element 73 bears against rearward vertical wall 76 in order to prevent vibrations and external forces from disrupting a desired alignment.

A vertical alignment arrangement embodied in the lens assembly stabilizer 33 includes a vertically aligned slideway 87 formed by rearward vertical wall 76 and a vertically aligned slide bar 88 formed by intermediate wall 74. Slideway 87 and slide bar 88 are of complementary dovetail configuration to assure that all vertical motion by slide bar 88 relative to slideway 87 will be restricted to a vertical direction. The manner in which vertical adjustment is accomplished will be described in conjunction with FIG. 4.

Directional arrow 89 indicates that by simultaneously rotating horizontal alignment elements 71 and 72 front wall 68 is automatically forced to slide laterally or horizontally of walls 74 and 76. When elements 71 and 72 are rotated in one direction then wall 68 is displaced or shifted to a given side and when elements 71 and 72 are rotated in the opposite direction then wall 68 is shifted to the other side. Since the frontal lens section 20 of zoom lens assembly 18, as shown in FIG. 1, is coupled within the lens assembly cradle 63, then any sideways or horizontal motion of vertical wall 68 automatically displaces and adjusts the alignment of the zoom lens assembly 18. A very fine or close tolerance adjustment can be accomplished because each complete rotation of horizontal alignment elements 71 and 72 corresponds to only a slight increment of horizontal displacement by vertical wall 68.

Figure 4:
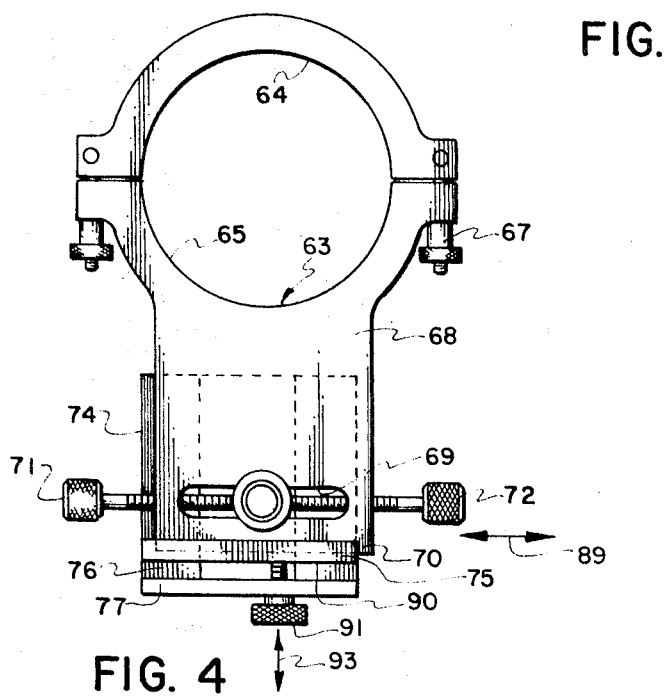
FIG. 4 is a fragmentary view in the direction indicated by arrow 4 of FIG. 2, showing the lens assembly cradle shifted both horizontally and vertically from its position shown in FIG. 2.

Referring now to both FIGS. 3 and 4 the structural arrangement by which fine or close tolerance vertical adjustment can be accomplished will now be described. A channel structure base 90 that defines positioning channel structure 75 is arranged in contact with a vertical alignment element 91. Element 91 includes a threaded section 92 interengaged with an internally threaded opening formed in ledge 77. As indicated by directional arrow 93 rotation of vertical alignment element 91 in one direction results in lifting vertical walls 68 and 74 so that the zoom lens assembly is raised while rotating alignment element 91 in the opposite direction results in lowering the zoom lens assembly. A particular object can be brought into perfect accurate alignment with the lens by manipulating vertical alignment element 91. Before vertical alignment element 91 is used to adjust the vertical alignment, the stabilizer element 73 shown in FIG. 3 must be loosened or unlocked away from vertical wall 76. After vertical adjustment has been achieved the stabilizer element 73 is again tightened against wall 76 so that there can be no inadvertent vertical displacement between wall 76 and wall 74.

OPERATION

Keeping the above construction in mind, it can be understood how many of the previously described disadvantages of conventional motion picture camera mounts are overcome or substantially eliminated by the present invention.

Assuming that a professional cameraman using an Arriflex motion picture camera 11 to obtain high quality filming results for a television program wishes to quickly switch from handheld motion picture taking to tripod-held motion picture taking, then the cameraman gently orients camera 11 so that handle 11a is located within large recess 50 and attachment pegs 53 and 54 are positioned within their respective attachment posts 51 and 52. Locking knob 52a is then tightened to bind attachment peg 54 to stand 31.

Clamping key 61 is loosened so slide member 59 can be slid forwardly along guide plate 32 and lens assembly cradle 63 is opened to receive the frontal lens section 20 of zoom lens assembly 18. After zoom lens assembly 18 has been properly arranged on the lens assembly stabilizer 33 it is shifted rearwardly until its lens ring 19 becomes inserted into lens port 14. Then clamping key 61 is tightened so that the resulting wedge force between guide plate 32 and slide member 59 can fix the desired position of zoom lens assembly 18. If the cameraman inadvertently forgets to tighten guide plate 32 and slide member 59 together then even if the camera becomes tilted downwardly it will be prevented from falling completely out of place due to the safety coupling between clamping key 61 and guide plate 32.

Matte box 21 is positioned on the frontal lens section 20 after its cross rod 26 has been slid through a sufficient distance along iris rods 27 and 28. When the cameraman subsequently wishes to adjust the lens focus or some other characteristic by rotating frontal lens section 20 the frontal lens section 20 will be moved independently or filter panel 24. Therefore, the polarization characteristics of filter panel 24 will not be disturbed and the desired lighting intensity will neither be dimmed nor brightened relative to the desired light exposure established by the selected filter panel 24.

After the relative structural arrangement has been established between stand 31, guide plate 32, lens assembly 33, motion picture camera 11, zoom lens assembly 18, and matte box 21 then all of these components, as a unit, are slid forwardly or rearwardly on base 29 until their combined center of gravity overlies the swivel head 16 of the camera tripod 15. When the combined center of gravity is shifted to an overcenter point relative to the tripod swivel head 16 then, due to the resulting optimum balancing, the cameraman can effortlessly swing camera 11 through the necessary panning maneuvers in order to maintain moving objects in viewing alignment. In addition it is much easier to adjust the camera 11 from one fixed attitude to another. It will be appreciated that as heavier zoom lens assemblies and matte boxes are positioned on adjustable camera mount 10 the combined center of gravity shifts forwardly and therefore the cameraman must pull the previously mentioned combined components more rearwardly to achieve the desired balancing.

In order to bring an object into center alignment camera 11 is moved by manipulating handle 17 until the object is approximately centered. Camera mount 10 is then locked relative to tripod 15 by a conventional locking mechanism (not shown). Horizontal alignments elements 71 and 72 are simultaneously rotated until the object is properly horizontally aligned. Stabilizer element 73 is loosened and then vertical alignment element 91 is manipulated until the object is properly vertically aligned. When the object is both vertically and horizontally aligned and therefor perfectly centered it is prepared to be filmed.

When the cameraman wishes to switch from tripod-held to hand-held motion picture taking then camera 11 can be swiftly removed from adjustable camera mount 10 by shifting stabilizer 33 forwardly, loosening locking knob 52a and then lifting camera 11 away from mount 10. Subsequently the camera 11 can be restored to its previous tripod-held position with only minimum adjustments required.

From the foregoing it will be evident that the present invention has provided an adjustable camera mount in which all of the various advantages are full realized.

What I claim is:

1. An adjustable camera mount comprising:
  a. a carrier structure for demountably carrying a camera, the carrier including a guide plate formed with a guide slot;
  b. a lens assembly stabilizer including a slide member positioned in the guide slot and a cradle for holding a lens assembly; and,
  c. lens adjustment means for displacing the cradle relative to the slide member.

2. The structure according to claim 1, including:
  a recess formed in a side portion of the carrier structure to facilitate entrance and positioning of a camera section; and,
  attachment posts fixed to the carrier structure at spaced locations adjacent the recess edge, the posts being arranged to mount and align the camera.

3. The structure according to claim 2, including:
  a motion picture camera having attachment pegs and a depending handle, the pegs being secured in the attachment posts and the depending handle being positioned in the recess.

4. The structure according to claim 1, including:
  a base for slidably mounting the carrier structure.

5. The structure according to claim 4, wherein:
  the base has a raised section of dovetail configuration with upwardly flaring sidewalls, the raised section being formed with a parallel and laterally spaced slide channels;
  the carrier structure bottom is formed with an interlocking groove of dovetail configuration, the interlocking groove and raised section dovetail configurations being of complementary shape to permit relative sliding;
  a snap lock is secured to the carrier structure and extends into one slide channel; and,
  a screw lock is secured to the carrier structure and extends into the other slide channel.

6. The structure according to claim 1, including:
  a clamping element extending through the slide member into disengageable contact with the guide plate, the clamping element being operable to clamp the guide plate and slide member together when engaged against the guide plate and permit relative sliding movement between them when disengaged from the guide plate.

7. The structure according to claim 6, wherein:
  the slide member and guide slot are of complementary dovetail configuration.

8. The structure according to claim 1, including:
A pair of parallel and laterally spaced rods secured to the carrier structure and generally aligned beneath the carrier structure and lens assembly stabilizer.

9. The structure according to claim 8, wherein:
The rods are aligned generally parallel with the guide slot and; and,
a matte box is slidably mounted on the rods for movement toward and away from the cradle.

10. The structure according to claim 1, wherein the lens adjustment means includes:
a horizontal alignment means and a vertical alignment means for displacing the cradle horizontally and vertically respectively relative to the slide member.

11. The structure according to claim 1, wherein the lens adjustment means includes:
a first wall coupled to and located beneath the cradle;
the second wall located between the first wall and slide member;
a stabilizer element interconnecting the first and second walls; and,
horizontal alignment means coupled to the first plate and arranged in engagement with the stabilizer element,
wherein force applied by the horizontal alignment means against the stabilizer element results in horizontal displacement of the first wall relative to the second wall and slide member.

12. The structure according to claim 11, wherein the horizontal means includes:
a pair of coaxially aligned screws interengaged with threaded openings formed in opposing sides of the first wall, the ends of the screws being engaged with opposing sides of the stabilizer element.

13. The structure according to claim 11, including:
a third wall located between the second wall and slide member; and,
vertical alignment means coupled to the third wall and arranged in engagement with the second wall,
wherein force applied by the vertical alignment means against the second wall results in vertical displacement of the first plate and second plate relative to the third plate and slide member.

14. The structure according to claim 13, wherein:
adjacent portions of the second and third walls are formed with a slideway and slide bar of complementary dovetail configuration; and,
the stabilizer element is arranged for movement into engagement with the third wall in order to fix the relative positions of the second and third walls.

15. The structure according to claim 13, including:
a ledge connected to the third wall and extending forwardly beneath the bottom edges of the first and second walls, and wherein,
the vertical alignment means is a screw interengaged with a threaded opening formed in the ledge.

16. The structure according to claim 15, including:
a positioning lip formed by the bottom edge of the first wall; and,
a channel structure formed by the bottom of the second wall, the top portion of channel structure forming a horizontal channel for receiving the lip in sliding engagement, and the bottom portion of the channel structure being in engagement with the vertical alignment means.